(12) United States Patent
Sarker et al.

(10) Patent No.: US 11,533,655 B2
(45) Date of Patent: Dec. 20, 2022

(54) METHOD OF DETECTING QUICK USER DATAGRAM PROTOCOL INTERNET CONNECTIONS, QUIC, TRAFFIC IN A TELECOMMUNICATION NETWORK BETWEEN A USER EQUIPMENT, UE, AND A CONTENT PROVIDER, CP

(71) Applicant: Telefonaktiebolaget LM Ericsson (PUBL), Stockholm (SE)

(72) Inventors: Zaheduzzaman Sarker, Järfälla (SE); Miguel Angel Muñoz De La Torre Alonso, Madrid (ES); Marcus Ihlar, Älvsjö (SE); Veronica Sanchez Vega, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/271,794

(22) PCT Filed: Oct. 4, 2018

(86) PCT No.: PCT/EP2018/076956
§ 371 (c)(1),
(2) Date: Feb. 26, 2021

(87) PCT Pub. No.: WO2020/043319
PCT Pub. Date: Mar. 5, 2020

(65) Prior Publication Data
US 2021/0345162 A1 Nov. 4, 2021

(30) Foreign Application Priority Data
Aug. 27, 2018 (EP) .................................. 18382626

(51) Int. Cl.
*H04W 28/02* (2009.01)
*H04W 80/06* (2009.01)
*H04W 92/10* (2009.01)

(52) U.S. Cl.
CPC ....... *H04W 28/0273* (2013.01); *H04W 80/06* (2013.01); *H04W 92/10* (2013.01)

(58) Field of Classification Search
None
See application file for complete search history.

(56) References Cited

U.S. PATENT DOCUMENTS

2019/0215730 A1* 7/2019 Qiao ..................... H04W 60/00
2019/0313468 A1* 10/2019 Talebi Fard ........ H04W 40/246
(Continued)

FOREIGN PATENT DOCUMENTS

| CN | 107113294 A | 8/2017 |
| CN | 107846713 A | 3/2018 |
| WO | 2018024345 A1 | 2/2018 |
| WO | 2018086076 A1 | 5/2018 |

OTHER PUBLICATIONS

3GPP TR 23.787 v0.4.0; Technical Report; 3rd Generation Partnership Project; Technical Specification Group Services and System Aspects; Study on encrypted traffic detection and verification (Release 16)—Jun. 2018.
(Continued)

*Primary Examiner* — Diane L Lo
(74) *Attorney, Agent, or Firm* — Baker Botts, LLP (57) ABSTRACT

A method of detecting Quick User Datagram Protocol Internet Connections, QUIC, traffic in a telecommunication network between a User Equipment, UE, and a Content Provider, CP, wherein said UE has an established application session with said CP, for a particular application, using QUIC as transport protocol, wherein said method comprises the steps of receiving, by a User Plane Function, UPF,
(Continued)

comprised by said telecommunication network, from said CP, a list of connection identifiers that identify said established application session between said UE and said CP, receiving, by said UPF, a QUIC packet comprising a connection identifier, detecting, by said UPF, said QUIC traffic by determining that said connection identifier of said received QUIC packet is comprised by said list of connection identifiers.

15 Claims, 4 Drawing Sheets

(56) References Cited

U.S. PATENT DOCUMENTS

2020/0053828 A1* 2/2020 Bharatia ............. H04W 68/005
2021/0168665 A1* 6/2021 Salkintzis ............. H04L 63/168

OTHER PUBLICATIONS

3GPP TR 23.737 v0.4.0; Technical Report; 3rd Generation Partnership Project; Technical Specification Group Services and System Aspects; Study on encrypted traffic detection and verification (Release 16)—Jun. 2018.

3GPP TR 29.893 v0.1.0; Technical Report; 3rd Generation Partnership Project; Technical Specification Group Core Network an Terminals; Study on IETF QUIC Transport for 5GC Service Based Interfaces; (Release 16)—Jul. 2018.

3GPP TS 23.501 v15.1.0; Technical Specification; 3rd Generation Partnership Project; Technical Specification Group Services and System Aspects; System Architecture for the 5G System; Stage 2 (Release 15)—Mar. 2018.

3GPP TS 29.522 v0.2.0; Technical Specification; 3rd Generation Partnership Project; Technical Specification Group Core Network and Terminals; 5G System; Network Exposure Function Northbound APIs (Release 15)—Apr. 2018.

PCT International Search Report issued for International application No. PCT/EP2018/076956—dated Apr. 8, 2019.

QUIC: A UDP-Based Multiplexed and Secure Transport; Intended Status: Standards Track; Expires: Nov. 23, 2018 by J. Iyengar and M. Thomson—May 22, 2018.

PCT Written Opinion of the International Searching Authority issued for International application No. PCT/EP2018/076956—dated Apr. 8, 2019.

Chinese Office Action issued for Application No. 201880099141—dated Oct. 10, 2022.

* cited by examiner

METHOD OF DETECTING QUICK USER DATAGRAM PROTOCOL INTERNET CONNECTIONS, QUIC, TRAFFIC IN A TELECOMMUNICATION NETWORK BETWEEN A USER EQUIPMENT, UE, AND A CONTENT PROVIDER, CP

FIELD OF THE INVENTION

The present invention is related to Quick User Datagram Protocol Internet Connection, QUIC, traffic in a telecommunication network and, more specifically, to a method for enabling traffic differentiation in a telecommunication network in case of applications using QUIC as transport.

BACKGROUND

The 3GPP standard has defined a system architecture for the next generation mobile networks that will be the next major phase of mobile telecommunication standards beyond the current 4G. This architecture has been specified in 3GPP TS 23.501.

Having Service based interfaces in the control plane implies that the Network Functions, NFs, interaction is done by means of services: the NFs in the 5G Content Providers provide services that are consumed by other NFs in the 5G. The roles of these entities and the interfaces have been defined in the 3GPP T 23.501.

The present disclosure is related to Quick User Datagram Protocol Internet Connection, QUIC, traffic, and, more specifically, to a method of detecting such a traffic.

QUIC, Quick UDP Internet Connection, is a UDP-based, stream-multiplexing, encrypted transport protocol. QUIC is basically a UDP based alternative for TCP. QUIC is now under standardization at IETF.

Some firms already use a pre-standard version of QUIC for substantial part of its traffic (e.g. YouTube, Search, Duo) and QUIC may soon represent a significant percentage of internet traffic from other service providers as the standard version of QUIC is matured. QUIC is a likely candidate to become the main transport protocol in the User Plane and it is expected that most applications, today mainly HTTP over TLS/TCP, will migrate to QUIC, when QUIC is standardized by IETF.

On top of UDP, QUIC may include a long and a short header. Each of these headers may include a destination connection identifier, a packet number and a payload. The long header may, amongst other, even comprise a payload length and a source connection identifier.

Connection ID identifies a QUIC connection in an endpoint. Each endpoint sets a value that its peer includes in packets. This connection ID can change over the lifetime of a connection, especially in response to a QUIC connection migration.

In the initial QUIC packets, i.e. long header packets, each endpoint specifies a source connection ID, that connection ID may be used as the destination connection ID in packets transmitted by the peer. If an endpoint sets the SCIL, i.e. the source connection id length, value to 0, connection IDs will be omitted from packets transmitted by the peer.

QUIC allows connections to survive changes to endpoint addresses, for example IP address and/or port, such as those caused by an endpoint migrating to a new network. Following connection migration procedures are supported:

Explicit migration to a new address if available and desired. This will enable seamless UE handovers between WLAN and cellular accesses when no MNO IP address preservation.

Implicit migration to new IP if NAT rebinding.

The mechanism for connection migration is based on the following:
  Path Probing
    Path Challenge and Path Response frames exchanged.
  Endpoint address validation
    Successful exchange of Challenge/Response.
  Path Committing
    An Endpoint attaches to a new path when data is received on said path.

In addition to connection migration, a QUIC client might wish to reduce connection linkability by passive observers by employing a new connection ID and source UDP port when sending traffic after a period of inactivity. Changing the UDP port from which it sends packets at the same time might cause the packet to appear as a connection migration. This ensures that the mechanisms that support migration are exercised even for clients that don't experience NAT rebindings or genuine migrations due to access network changes.

QUIC protocol supports a "NEW_CONNECTION_ID" frame which is encrypted, so peers are allowed to change connection ID. A NEW_CONNECTION_ID frame consists of a new connection ID value, it's associated length and a sequence number. If an endpoint desires to use a new connection ID, it must select an ID in the correct sequence order. An endpoint that wishes to provide multiple viable connection IDs to its peer will transmit multiple NEW_CONNECTION_ID frames.

According to the state of the art, the information that the Content provider, i.e. QUIC server, is able to communicate to the network operator so that the network operator is able to differentiate and classify the Content provider's traffic appropriately, is the information contained in the standardized PFD, i.e. Packet Flow Description. This is a set of information enabling the detection of application traffic including: PFD id; a 3-tuple, i.e. including protocol, server-side IP address and port number; or the significant parts of the URL to be matched, e.g. host name; or a Domain name matching criteria.

No differentiation is currently possible in multi-access network scenarios, where there is no linking between traffic going through each access network, e.g. each one going using different 5-tuples and different QUIC Connection ID. This results in relevant impact on existing network operator Use Cases, e.g. Sponsored Data, QoS, Traffic Optimization, etc., for applications using QUIC as transport.

SUMMARY

It is an object of the present disclosure to provide for a method which allows operators to differentiate applications running over QUIC, that are not possible to be differentiated with state of the art solutions.

It is another object to provide for a User Plane Function, UPF, arranged to perform the new method.

In a first aspect, there is provided a method of detecting Quick User Datagram Protocol Internet Connections, QUIC, traffic in a telecommunication network between a User Equipment, UE, and a Content Provider, CP, wherein said UE has an established application session with said CP, for a particular application, using QUIC as transport protocol.

The method comprises the steps of:
- receiving, by a User Plane Function, UPF, comprised by said telecommunication network, from said CP, a list of connection identifiers that identify said established application session between said UE and said CP;
- receiving, by said UPF, a QUIC packet comprising a connection identifier;
- detecting, by said UPF, said QUIC traffic by determining that said connection identifier of said received QUIC packet is comprised by said list of connection identifiers.

The advantage of the above described example is that it allows an operator to differentiate applications running over QUIC, specifically when QUIC Server Name Indication is encrypted/obfuscated and/or under QUIC connection migration scenarios, i.e. multi-access networks, that are not possible to be differentiated with state of the art solutions.

That is, each incoming packet having a connection identifier that is part of the list of connection identifiers may be classified, i.e. associated with the application session between the UE and the Content Provider.

This is especially helpful in situations in which a particular User Equipment, UE, enters another access network while the actual application traffic continues. In such a case, the UE will use a different connection identifier, but it is ensured that the different connection identifier is part of the list of connection identifiers such that any node in the network, for example the UPF, is able to correlate new packets, with the updated/new connection identifiers, to the already established application session. As such, any node of the network is able to establish that the application traffic belongs to the application as established during the initial phase, i.e. the application session establishment.

In an example, the step of receiving said list of connection identifiers comprises:
- receiving, by said UPF, an application identifier for identifying said particular application associated with said application session such that said list of connection identifiers is associated with said particular application; wherein said method further comprises the steps of:
- receiving, by said UPF a further QUIC packet comprising a further connection identifier;
- associating, by said UPF, said QUIC packet to said application session by determining that said further connection identifier is also comprised by said list of connection identifiers.

The above described example discloses the situation in which a further packet, received from the same UE and associated with the same application session, actually comprises a further connection identifier. The UPF is then able to determine, i.e. associate, the packet to the same application session by determining that the further connection identifier is within the list of connection identifiers.

In another example, the step of receiving said list of connection identifiers comprises:
- receiving, by said UPF, from a Session Management Function, SMF, a Session Modification Request for requesting a modification of a session between said UE and said CP, wherein said request is received through an N4 interface.

It was found that it is not necessary to implement new signalling in the telecommunication network for conveying the list of connection identifiers to the UPF. The already existing session modification request, for example the N4 Packet Forwarding Control Protocol, PFCP, session modification request, may be used for informing the UPF accordingly.

Preferably, the session modification request is answered, by the UPF, towards the SMF using a session modification response, wherein a successful response implies that the UPF has accepted, amongst other, the list of connection identifiers.

In a further example, the step of receiving said list of connection identifiers comprises:
- receiving, by said UPF, an application identifier for identifying said particular application associated with said application session, such that said list of connection identifiers is associated with said particular application; and wherein said method further comprises the steps of:
- keeping track, by said UPF, a volume for an application corresponding to an application session by mapping said received connection identifier to said application identifier, and
- reporting, by said UPF, to a Session Management Function, SMF, said volume.

It was found that the UPF is able to keep track of the volume for an application in the following manner. The packets exchanged between the UE and the CP comprise a connection identifier. The UPF is able to correlate that particular connection identifier, more particular the list of connection identifiers to which said connection identifier belongs to, to a particular application using the application identifier.

The UPF then needs to map the received connection identifier to the application identifier.

The advantage of the above is that the volume for an application is tracked accurately. In prior art situations, the volume for an application is not tracked accurately in situations in which the UE has migrated to a new access network, such that the UE will use a different connection identifier. In such a case, it was not possible for the UPF to correlate the updated connection identifier with the application session, let alone the application associated with that application session.

In another example, the QUIC packet is received from a first Radio Access Network, RAN, and wherein said method comprises the steps of:
- receiving, by said UPF, a subsequent QUIC packet comprising a subsequent connection identifier, from a second RAN, different from said first RAND, wherein said subsequent connection identifier differs from said connection identifier;
- detecting, by said UPF, said QUIC traffic by determining that said subsequent connection identifier of said received subsequent QUIC packet is comprised by said same list of connection identifiers.

The above described example explicitly described the situation in which the UE connects to the core network using a different RAN. The UE thus connects to the core network via a different base station, for example eNodeB, or via any other possible access network.

This is, for example, particularly useful for UE's that move across a geographical area. UE's that are located in a train that is travelling from a start location to an end location may be a typical example hereof. In such a situation it is likely that the UE will be handed over, once or multiple times, between different base stations, i.e. eNB's. During its stay in the train, the UE may, however, have a single application session established between the CP and the UE.

In a second aspect, there is provided a method of enabling the detection of Quick User Datagram Protocol Internet Connections, QUIC, traffic in a telecommunication network between a User Equipment, UE, and a Content Provider, CP.

The method comprises the steps of:
- establishing, by said CP, an application session between said UE and said CP using QUIC as transport protocol;
- establishing, by said CP, a connection identifier that identifies said established application session between said UE and said CP;
- creating, by said CP, a list of connection identifiers that identify said established application session between said UE and said CP, wherein said established connection identifier is comprised by said list;
- providing, by said CP, said list of connection identifiers to said telecommunication network for enabling said telecommunication network to detect said QUIC traffic using said list of connection identifiers.

The above described method is drafted from the point of view of the CP. The CP is the node that may be responsible for creating a list of connection identifiers, and for providing the connection identifiers to the telecommunication network. The list of connection identifiers is, for example, to be provided to the UPF.

It is noted that the CP may determine itself how many identifiers should be used for a single list of connection identifiers. The list may comprise three to five connection identifiers, 5 to eight connection identifiers, eight to twenty connection identifiers, or any other feasible range. The present disclosure is not limited to the amount of connection identifiers present in the list of connection identifiers. It is noted that the list of connection identifiers should comprise at least two connection identifiers in order to obtain the advantages as mentioned above.

The advantages of the first aspect of the disclosure are also inherently a part of the second aspect, and third aspect, of the disclosure. Furthermore, it is pointed out that although the claims read as if all the modules/equipment according to this second aspect of the present disclosure are incorporated into a single entity/node, a person skilled in the art understands that the same disclosure could be implemented by, for example, distributing each of the modules over several nodes. Alternately, the disclosure could also be purely implemented in the cloud, whereby none of the physical nodes possess any of these modules/equipment as such.

In an example, the step of providing comprises:
- providing, by said CP, said list of connection identifiers to a Network Exposure Function, NEF, in a HTTP POST message.

The advantage of the above described example is that there is no need to create an additional message in the telecommunication network, for example a 5G telecommunication network, for conveying the list of connection identifiers. The HTTP POST message is a message which already exists in the network and is suitable for this particular purpose.

In an example, the HTTP POST message comprises an application identifier for identifying an application, a UE Internet Protocol, IP, address for locating said UE and a flow description, wherein said flow description comprises said list of connection identifiers.

In a third aspect, there is provided a User Plane Function, UPF, arranged for detecting Quick User Datagram Protocol Internet Connections, QUIC, traffic in a telecommunication network between a User Equipment, UE, and a Content Provider, CP, wherein said UE has an established application session with said CP, for a particular application, using QUIC as transport protocol The UPF comprises:
- receive equipment arranged for receiving, from said CP, a list of connection identifiers that identify said established application session between said UE and said CP, and for receiving, by said UPF, a QUIC packet comprising a connection identifier;
- detect equipment arranged for detecting said QUIC traffic by determining that said connection identifier of said received QUIC packet is comprised by said list of connection identifiers.

In a further example, the receive equipment is further arranged for receiving said list of connection identifiers as well as an application identifier for identifying said particular application associated with said application session such that said list of connection identifiers is associated with said particular application;
wherein said receive equipment further is further arranged for receiving a further QUIC packet comprising a further connection identifier;
and wherein said UPF further comprises process equipment arranged for associating, by said UPF, said QUIC packet to said application session by determining that said further connection identifier is also comprised by said list of connection identifiers.

In another example, the receive equipment is further arranged for receiving, from a Session Management Function, SMF, a Session Modification Request for requesting a modification of a session between said UE and said CP, wherein said request is received through an N4 interface.

In an example, the receive equipment is arranged for receiving said list of connection identifier as well as an application identifier for identifying said particular application associated with said application session, such that said list of connection identifiers is associated with said particular application, and wherein said UPF further comprises:
- process equipment arranged for keeping track of a volume for an application corresponding to an application session by mapping said received connection identifier to said application identifier, and for reporting to a Session Management Function, SMF, said volume.

In a further example, the QUIC packet is received from a first Radio Access Network, RAN, and wherein said receive equipment is further arranged for receiving a subsequent QUIC packet comprising a subsequent connection identifier, wherein said subsequent connection identifier differs from said connection identifier, and wherein said detect equipment is further arranged for detecting said QUIC traffic by determining that said subsequent connection identifier of said received subsequent QUIC packet is comprised by said same list of connection identifiers.

In a fourth aspect, there is provided, a Content Provider, CP, arranged for enabling the detection of Quick User Datagram Protocol Internet Connection, QUIC, traffic in a telecommunication network between a User Equipment, UE, and said CP, wherein said CP comprises:
- establish equipment arranged for establishing an application session between said UE and said CP using QUIC as transport protocol and for establishing a connection identifier that identifiers said established application session between said UE and said CP;
- create equipment arranged for creating a list of connection identifiers that identify said established application session between said UE and said CP, wherein said established connection identifier is comprised by said list;
- provide equipment arranged for providing said list of connection providers to said telecommunication network for enabling said telecommunication network to detect said QUIC traffic using said list of connection identifiers.

In an example, the provide equipment is further arranged for providing said list of connection identifiers to a Network Exposure Function, NEF, in a HTTP POST message.

In a further example, the HTTP POST message comprises an application identifier for identifying an application, a UE internet Protocol, IP, address for locating said UE and a flow description, wherein said flow description comprises said list of connection identifiers.

In a fifth aspect, there is provided a computer program product comprises a computer readable medium having instructions which, when executed by a computer, cause said computer to perform a method in accordance with any of the method examples as disclosed above.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
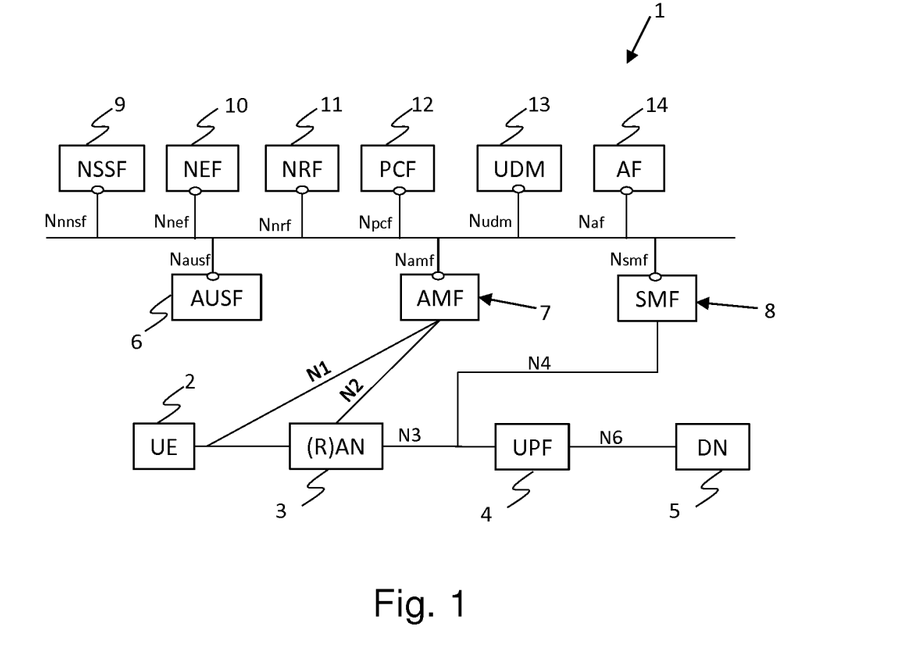
FIG. 1 schematically illustrates a part of a reference architecture of a Fifth Generation, 5G, telecommunication network.

FIG. 1 schematically illustrates part of the reference architecture 1 of a fifth generation, 5G, Service Based Architecture, SBA, to be deployed in a core network of a telecommunications system, in accordance with the prior art. The 5G system architecture 1 generally distinguishes the following logical Network Functions, NFs:

Authentication Server Function, AUSF, 6
Access and Mobility Management Function, AMF, 7
Network Exposure Function, NEF, 10
NF Repository Function, NRF, 11
Policy Control Function, PCF, 12
Session Management Function, SMF, 8
Network Slice Selection Function, NSSF, 9
Unified Data Management, UDM, 13
Application Function, AF, 14.

The logical NFs 6-14 of the Core Network are built of one or more services and together form an SBA domain. Within the SBA domain, service messages are communicated and exchanged over respective communication interfaces, indicated by a capital N followed by one of the above-mentioned abbreviations of the NFs. That is, interface Namf is the service message communication interface towards the AMF 7, etcetera.

Communication entities supported by the SBA in the core network of a telecommunications system are generally referenced as:

User Equipment, UE, 2
(Radio) Access Network, (R)AN, 3
User Plane Function, UPF, 4
Data Network, DN, 5, for example operator services, Internet access and $3^{rd}$ party services.

Operational or signalling messages between the communication entities 2-5 and the SBA domain 6 are exchanged over respective control plane interface functionality, termed N1, N2 and N4, as shown in FIG. 1. That is, interface functionality or protocol N1 pertains to UE related operational messages, interface functionality or protocol N2 relates to RAN operational messages, i.e. exchanged with a node or server in a RAN 3, and interface functionality or protocol N4 pertains to UPF related operational messages.

A functional description of the above-mentioned network functions, interfaces and communication protocols is available from the Third Generation Partnership Project, 3GPP, standard 23.501, "System Architecture for the 5G system", the contents of which are included herein, by reference.

Figure 2:
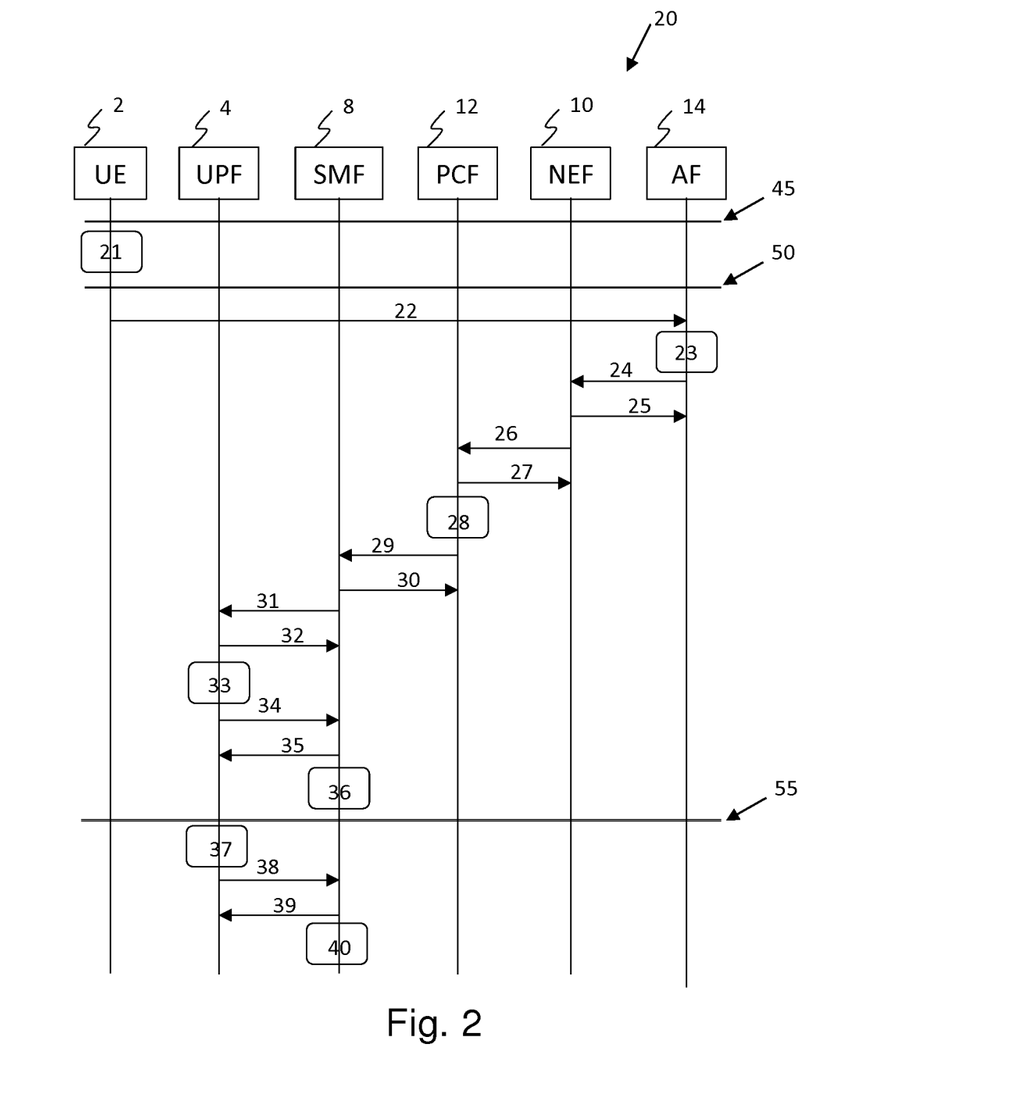
FIG. 2 schematically illustrates a method according to the present disclosure.

FIG. 2 schematically illustrates a method 20 according to the present disclosure. The proposed solution according to the present disclosure consists of an extension of 3GPP Nnef interface by defining a new Application Programming Interface, API, allowing the content provider to send, to the network operator, the pool of Quick User Datagram Protocol Internet Connections, QUIC, Connection Identifiers, IDs.

A sequence diagram 20, is shown in FIG. 2 and illustrates an example of connection migration because of access changes when Wireless Local Area Network, WLAN, traffic is routed through UPF. The steps of the method 20, are explained in detail. It may be required for the UE 2 to trigger 45 a Protocol Data Unit, PDU, session establishment. The detailed steps for such a triggering 45 are known to the person skilled in the art and are not elaborated further in the present disclosure.

In a first step 21, the UE starts an application, for example YouTube, that uses QUIC as transport protocol. The server and the client establish a connection ID, CID, during the handshake process. Furthermore, the server may send a list of alternative connection IDs via NEW_CONNECTION_ID frame to the client those could be used during the session by the application users.

It may be noted that the Server Name Identification, SNI, field in the QUIC Client Hello, CHLO, message could be encrypted or obfuscated as proposed in Transport Layer Security, TLS, 1.3. This implies that the existing domain name packet flow description, PFD, rule which mainly refers to TLS SNI field is not valid to detect application traffic. The solution proposed according to the present disclosure also addresses this case of SNI obfuscation/encryption.

In steps 22, 23 and 24, the Over The Top, OTT, service provider, for example, Google Inc., then stores/retrieves the established and alternative QUIC Connection Identifiers (CIDs) and triggers a new procedure to send them to the network operator. It is proposed to create a new API in 3GPP Technical Specification, TS, 29.522 as described below:

For initial application session creation, the AF 14 sends 24 an Hypertext Transfer Protocol, HTTP, POST message to the NEF 10. The body of HTTP POST message may include the AF Identifier, for example Google Inc., the external AppId, for example YouTube, the UE Internet Protocol, IP, Address and the Flow description which is extended with the QUIC CID pool which is basically a list of QUIC of valid connection identifiers. The CID pool contains the valid connection IDs that will be observed in the uplink direction of the QUIC session, the destination connection ID that will be observed in the downlink may also need to be provided.

Optionally, AF 14 may also indicate the requested enforcement action for the application by providing a Sponsored Data flag and/or a Quality of Service, QoS, reference, for example. In this example, we assume the enforcement action is determined by policies locally configured at operator's network for the target application.

After receiving the message in step 24, the NEF 10 shall authorize the request, map the externalAppId to an internal appId and respond back to AF 14 via an Nnef 200 OK successful response in this case. The NEF 10 shall interact 26 with the PCF 12 through Npcf by sending the parameters indicated above namely—AF identifier, AppId, UE IP Address and Flow Description including the QUIC CID pool.

After receiving the message in step 26, PCF 12 shall respond 27 back to NEF 10 via an Npcf 200 OK successful response, and look for the SMF 8 handling the PDU session corresponding to the UE IP Address parameter. PCF 12 will then trigger an Nsmf HTTP POST message 29 towards the target SMF 8 by installing 28 a PCC rule for the target application including AppId=YouTube, ratingGroup=RG1 (free rate), Flow Description including QUIC CID pool.

The SMF 8 shall respond 30 back to PCF 12 with an Nsmf 200 OK successful response and modifies the PFCP session towards UPF 4 by triggering N4 PFCP Session Modification Request 31, including the corresponding Packet Detection Rules, PDRs, Forwarding Action Rules, FARs, QoS Enforcement Rules, QERs, and Usage Reporting Rules, URRs. It is proposed to extend the PDR with a new field including the QUIC CID pool for example in the PDR of SDF Filter type.

In step 32, the UPF 4 will respond to the SMF 8 with the N4 PFCP Session Modification Response, wherein a successful response implies UPF has accepted the PDR rules as mentioned previously.

In step 33, UPF 4 detects YouTube application traffic based on the PDR information indicated above, specifically by matching the QUIC CID, which is in cleartext at the QUIC header, of the incoming packets with the pool of QUIC CIDs received through N4 interface. If there is a match, packets are classified as YouTube. Note that it is possible that classification is based on connection ID in one direction of the flow whereas the 5tuple is used in the other direction (for example, when the client has set SICL to 0 in the initial handshake.

The UPF 4 triggers 34 towards SMF 8, a PFCP Session Report Request to report volume for the YouTube application. The SMF 8 answers back to UPF 4 with a PFCP Session Report Response 35 and generates 36 a Call Detail Record, CDR, with YouTube volume and RG1 (free rate).

At some point during an ongoing session, i.e. while YouTube application is ongoing, UE 2 enters 55 another access network for example, managed WLAN. In this case, UE 2 will use a different QUIC CID to send YouTube application traffic on the new access network. Assuming traffic is routed through UPF 4, UPF 4 detects 37 YouTube application traffic on the new access network by matching incoming packets QUIC CID (which is in cleartext at the QUIC header) with the pool of QUIC CIDs received through N4 interface. If there is a match, packets are classified as YouTube traffic from the same UE 2 and QUIC session. When a known connection ID is observed on a new 5tuple, that 5tuple will be used for classification in the reverse path if 0-length connection ID is used in that direction.

It may be noted that in the most common case, when changing access network, the UE IP address would change. Therefore, apart from the CID change, the flow/5-tuple would change as well. It is also possible that the UE IP address is kept wherein only the CID will change, and the traffic would be carried under the same flow/5-tuple. The mechanism proposed in the present disclosure is valid in both scenarios above.

Not shown in the sequence diagram in FIG. 2, but in case after a while, UE 2 selects back the former access network, e.g. from managed WLAN to New Radio, NR, UE 2 will use former flow, 5-tuple, and a new Connection ID. Assuming traffic is routed through UPF 4, UPF 4 detects YouTube application traffic on the new access network by matching incoming packets QUIC CID which is in cleartext at the QUIC header with the pool of QUIC CIDs received through N4 interface and if there is a match, packets are classified as YouTube.

In step 38, the UPF 4 triggers towards SMF 8 a PFCP Session Report Request to report volume for the YouTube application. The SMF 8 answers back 39 to UPF 4 with a PFCP Session Report Response and generates 40 a CDR with YouTube volume and RG1.

Not shown in the example sequence diagram in FIG. 2, but it is possible that the entire pool of connection IDs is not fully known in advance and that the server receives NEW_CONNECTION_ID frames from the client. When this happens, the server must update the NEF 10 with new connection ID values. Such updates will be sent to the NEF 10 using the HTTP PUT method.

The solution proposed in the present disclosure mainly addresses the case when the traffic traversing the different access networks passes through the UPF 4 network function, i.e. it refers to handover between managed accesses, such as NR, managed WLAN, where traffic is routed to UPF 4 without IP address preservation. It may also be noted that, for the sake of simplicity, handover signalling is not shown in the sequence diagram in FIG. 2. In case of handover between managed accesses, the client can be benefited by even not changing to alternative connection ID, hence the server reduces processing while they negotiate the connection IDs with network provider.

Finally, the solution described in the present disclosure does not only apply to 5G network architecture, but the same mechanisms can be applied to a Fourth Generation, 4G, telecommunication network just by replacing:

NEF by Service Capability Exposure Function, SCEF
AF by Service Capability Server/Application Server, SCS/AS
PCF by Policy Control Rules Function, PCRF
SMF by PDN Gateway Control Plane Function, PGW-C, or Traffic Detection Control Plane Function, TDF-C
UPF by PDN Gateway User Plane Function, PGW-U, or Traffic Detection User Plane Function, TDF-U
SMF/UPF by any other PEP such as Mobile Network Operator, MNO, SGi middlebox which has interface to PCRF.

Figure 3:
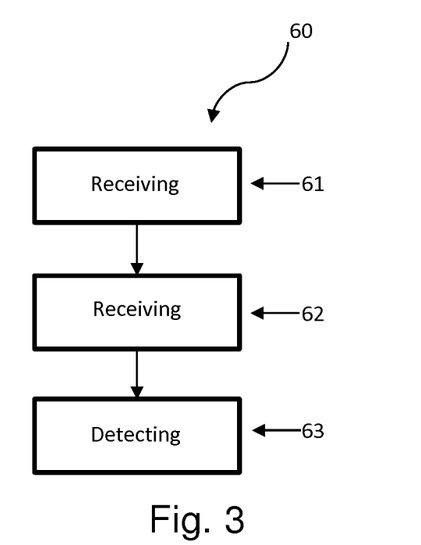
FIG. 3 discloses an example of a flowchart illustrating a method in accordance with the present disclosure.

FIG. 3 discloses an example of a flowchart 60 illustrating a method in accordance with the present disclosure.

A method of detecting Quick User Datagram Protocol Internet Connections, QUIC, traffic in a telecommunication network between a User Equipment, UE, and a Content Provider, CP, wherein said UE has an established application session with said CP, for a particular application, using QUIC as transport protocol.

The method 60 comprises the steps of:
receiving 61, by a User Plane Function, UPF, comprised by said telecommunication network, from said CP, a list of connection identifiers that identify said established application session between said UE and said CP;
receiving 62, by said UPF, a QUIC packet comprising a connection identifier;

detecting 63, by said UPF, said QUIC traffic by determining that said connection identifier of said received QUIC packet is comprised by said list of connection identifiers.

Figure 4:
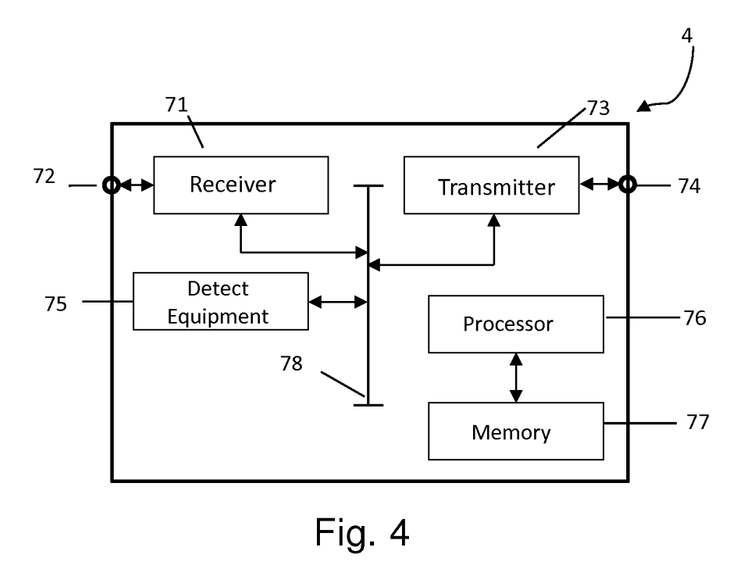
FIG. 4 discloses an example of a User Plane Function, UPF, in accordance with the present disclosure.

FIG. 4 discloses User Plane Function, UPF, 4 arranged for detecting Quick User Datagram Protocol Internet Connections, QUIC, traffic in a telecommunication network between a User Equipment, UE, and a Content Provider, CP, wherein said UE has an established application session with said CP, for a particular application, using QUIC as transport protocol.

The UPF is typically arranged to support packet routing & forwarding, packet inspection, Quality of Service, QoS, handling, act as an external Protocol Data Unit, PDU, session point of interconnect to a Data Network, DN, and is an anchor point for intra- & inter-RAT mobility.

The UPF comprises:

receive equipment 71 arranged for receiving, via a receiving terminal 72, from said CP, a list of connection identifiers that identify said established application session between said UE and said CP, and for receiving, by said UPF, a QUIC packet comprising a connection identifier;

detect equipment 75 arranged for detecting said QUIC traffic by determining that said connection identifier of said received QUIC packet is comprised by said list of connection identifiers.

It is noted that the receive equipment 71 does not, typically, receive the list of connection identifiers directly from the CP. The list of connection identifiers may traverse multiple nodes in the network before it is received by the UPF, for example the NEF, PCF and the SMF.

The UPF 4 may further comprise a transmitter 73 arranged for transmitting messages or packets via the transmitting terminal 74. Finally, the UPF 4 may comprise a processor 76, connected to a memory 77, and arranged to control the detect equipment 75, the receive equipment 71 and the transmitter 73 via a bus 78.

Figure 5:
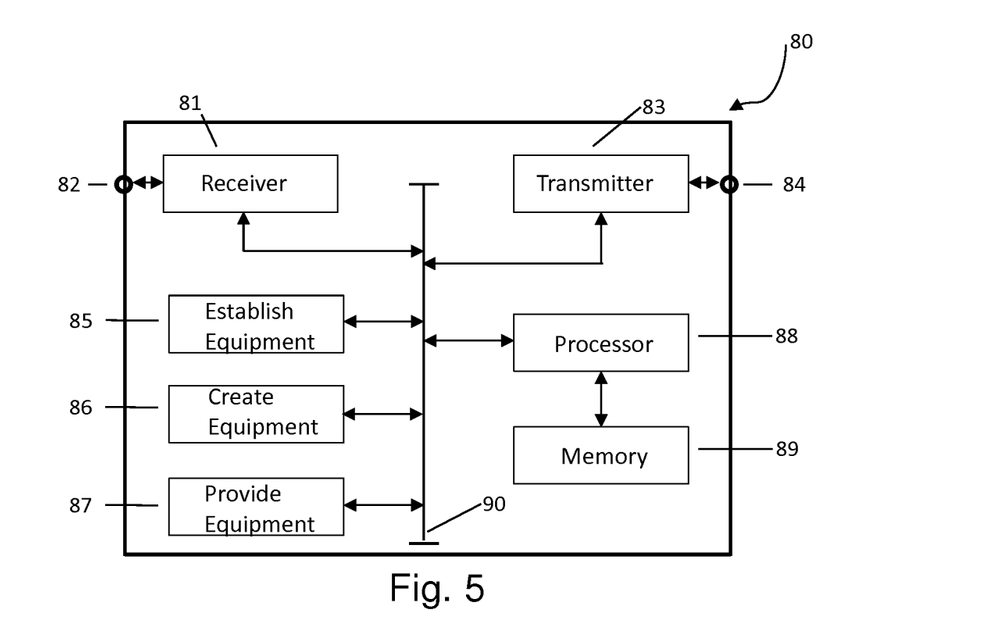
FIG. 5 discloses an example of a content provider in accordance with the present disclosure.

FIG. 5 discloses an example of a content provider 80 in accordance with the present disclosure.

The CP 80 arranged for enabling the detection of Quick User Datagram Protocol Internet Connection, QUIC, traffic in a telecommunication network between a User Equipment, UE, and said CP.

It is noted that the content provider may provide any type of content. Typically, the content to be provided is related to streaming services, like stream video and/or audio.

The said CP comprises:

establish equipment 85 arranged for establishing an application session between said UE and said CP using QUIC as transport protocol and for establishing a connection identifier that identifiers said established application session between said UE and said CP;

create equipment 86 arranged for creating a list of connection identifiers that identify said established application session between said UE and said CP, wherein said established connection identifier is comprised by said list;

provide equipment 87 arranged for providing said list of connection identifiers to said telecommunication network for enabling said telecommunication network to detect said QUIC traffic using said list of connection identifiers.

The CP is thus, in this example, responsible for generating the list of connection identifiers that the UE may use, such that any node in the network is still able to correlate/associate QUIC packets, having comprises a connection identifier, to the application session that has been established between the UE and the CP.

The CP may create a list having at least two connection identifiers, at least five connection identifiers or even at least ten connection identifiers. The present disclosure is not limited to the amount of connection identifier. The length of the list may be a static parameter, or may vary over time. The use of each of the connection identifiers may be monitored, and statistics may be obtained. Using the statistics, it may be decided to reduce, or increase, the length of the list of connection identifiers.

The CP 80 further comprises a receiver 81 for receiving incoming packets or messages via a receiving terminal 82. The CP 80 also comprises a transmitter 83 for transmitting packets or messages via a transmitting terminal 84.

Finally, the CP 80 comprises a processor 88 and a memory 89, wherein said processor is arranged to control any of the equipment 85, 86, 86 and the receiver 81 and the transmitter 83 via a bus 90.

Other variations to the disclosed examples can be understood and effected by those skilled in the art in practicing the claimed disclosure, from a study of the drawings, the disclosure and the appended claims. In the claims, the word "comprising" does not exclude other elements or steps and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

A computer program may be stored/distributed on a suitable medium, such as optical storage medium or a solid-state medium supplied together with or as part of other hardware, but may also be distributed in other forms, such as via the Internet or other wired or wireless telecommunication systems. Any reference signs in the claims should not be construed as limiting scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method of detecting Quick User Datagram Protocol Internet Connections, QUIC, traffic in a telecommunication network between a User Equipment, UE, and a Content Provider, CP, wherein said UE has an established application session with said CP, for a particular application, using QUIC as transport protocol, wherein said method comprises the steps of:

receiving, by a User Plane Function, UPF, comprised by said telecommunication network, from said CP, a list of connection identifiers that identify said established application session between said UE and said CP;

receiving, by said UPF, a QUIC packet comprising a connection identifier;

detecting, by said UPF, said QUIC traffic by determining that said connection identifier of said received QUIC packet is comprised by said list of connection identifiers, wherein said QUIC packet is received from a first Radio Access Network, RAN, and wherein said method comprises the steps of:

receiving, by said UPF, a subsequent QUIC packet comprising a subsequent connection identifier, from a second RAN, different from said first RAN, wherein said subsequent connection identifier differs from said connection identifier;

detecting, by said UPF, said QUIC traffic by determining that said subsequent connection identifier of said received subsequent QUIC packet is comprised by said same list of connection identifiers.

2. A method in accordance with claim 1, wherein said step of receiving said list of connection identifiers comprises:

receiving, by said UPF, an application identifier for identifying said particular application associated with said application session such that said list of connection identifiers is associated with said particular application;

wherein said method further comprises the steps of:

receiving, by said UPF a further QUIC packet comprising a further connection identifier;

associating, by said UPF, said QUIC packet to said application session by determining that said further connection identifier is also comprised by said list of connection identifiers.

3. A method in accordance with claim 1, wherein said step of receiving said list of connection identifiers comprises:

receiving, by said UPF, from a Session Management Function, SMF, a Session Modification Request for requesting a modification of a session between said UE and said CP, wherein said request is received through an N4 interface.

4. A method in accordance with claim 1, wherein said step of receiving said list of connection identifiers comprises:

receiving, by said UPF, an application identifier for identifying said particular application associated with said application session, such that said list of connection identifiers is associated with said particular application; and wherein said method further comprises the steps of:

reporting, by said UPF, to a Session Management Function, SMF, said volume.

5. A non-transitory computer readable storage medium storing instructions which, when executed by a computer, cause said computer to perform a method in accordance with claim 1.

6. A method of enabling the detection of Quick User Datagram Protocol Internet Connections, QUIC, traffic in a telecommunication network between a User Equipment, UE, and a Content Provider, CP, wherein said method comprises the steps of:

establishing, by said CP, an application session between said UE and said CP using QUIC as transport protocol;

establishing, by said CP, a connection identifier that identifies said established application session between said UE and said CP;

creating, by said CP, a list of connection identifiers that identify said established application session between said UE and said CP, wherein said established connection identifier is comprised by said list; providing, by said CP, said list of connection providers to said telecommunication network for enabling said telecommunication network to detect said QUIC traffic using said list of connection identifiers, wherein said QUIC packet is received from a first Radio Access Network, RAN, and wherein said method comprises the steps of:

receiving, by said UPF, a subsequent QUIC packet comprising a subsequent connection identifier, from a second RAN, different from said first RAN, wherein said subsequent connection identifier differs from said connection identifier; and detecting, by said UPF, said QUIC traffic by determining that said subsequent connection identifier of said received subsequent QUIC packet is comprised by said same list of connection identifiers.

7. A method in accordance with claim 6, wherein said step of providing comprises:

providing, by said CP, said list of connection identifiers to a Network Exposure Function, NEF, in a HTTP POST message.

8. A method in accordance with claim 7, wherein said HTTP POST message comprises an application identifier for identifying an application, a UE Internet Protocol, IP, address for locating said UE and a flow description, wherein said flow description comprises said list of connection identifiers.

9. A User Plane Function, UPF, arranged for detecting Quick User Datagram Protocol Internet Connections, QUIC, traffic in a telecommunication network between a User Equipment, UE, and a Content Provider, CP, wherein said UE has an established application session with said CP, for a particular application, using QUIC as transport protocol, wherein said UPF comprises:

receive equipment arranged for receiving, from said CP, a list of connection identifiers that identify said established application session between said UE and said CP, and for receiving, by said UPF, a QUIC packet comprising a connection identifier;

detect equipment arranged for detecting said QUIC traffic by determining that said connection identifier of said received QUIC packet is comprised by said list of connection identifiers, wherein said QUIC packet is received from a first Radio Access Network, RAN, wherein said receive equipment is further arranged for receiving a subsequent QUIC packet comprising a subsequent connection identifier, wherein said subsequent connection identifier differs from said connection identifier, and wherein said detect equipment is further arranged for detecting said QUIC traffic by determining that said subsequent connection identifier of said received subsequent QUIC packet is comprised by said same list of connection identifiers.

10. A UPF in accordance with claim 9, wherein said receive equipment is further arranged for receiving said list of connection identifiers as well as an application identifier for identifying said particular application associated with said application session such that said list of connection identifiers is associated with said particular application;

wherein said receive equipment further is further arranged for receiving a further QUIC packet comprising a further connection identifier;

and wherein said UPF further comprises process equipment arranged for associating, by said UPF, said QUIC packet to said application session by determining that said further connection identifier is also comprised by said list of connection identifiers.

11. A UPF in accordance with claim 9, wherein said receive equipment is further arranged for receiving, from a Session Management Function, SMF, a Session Modification Request for requesting a modification of a session between said UE and said CP, wherein said request is received through an N4 interface.

12. A UPF in accordance with claim 9, wherein said receive equipment is arranged for receiving said list of connection identifier as well as an application identifier for identifying said particular application associated with said application session, such that said list of connection identifiers is associated with said particular application, and wherein said UPF further comprises:

process equipment arranged for keeping track of a volume for an application corresponding to an application session by mapping said received connection identifier to said application identifier, and for reporting to a Session Management Function, SMF, said volume.

13. A Content Provider, CP, arranged for enabling the detection of Quick User Datagram Protocol Internet Connection, QUIC, traffic in a telecommunication network between a User Equipment, UE, and said CP, wherein said CP comprises:

establish equipment arranged for establishing an application session between said UE and said CP using QUIC as transport protocol and for establishing a connection identifier that identifiers said established application session between said UE and said CP;

create equipment arranged for creating a list of connection identifiers that identify said established application session between said UE and said CP, wherein said established connection identifier is comprised by said list;

provide equipment arranged for providing said list of connection providers to said telecommunication network for enabling said telecommunication network to detect said QUIC traffic using said list of connection identifiers, wherein said QUIC packet is received from a first Radio Access Network, RAN, wherein a subsequent QUIC packet comprising a subsequent connection identifier is received by said UPF, from a second RAN, different from said first RAN, wherein said subsequent connection identifier differs from said connection identifier, and wherein said QUIC traffic is detected by said UPF by determining that said subsequent connection identifier of said received subsequent QUIC packet is comprised by said same list of connection identifiers.

14. A CP in accordance with claim 13, wherein said provide equipment is further arranged for providing said list of connection identifiers to a Network Exposure Function, NEF, in a HTTP POST message.

15. A CP in accordance with claim 14, wherein said HTTP POST message comprises an application identifier for identifying an application, a UE internet Protocol, IP, address for locating said UE and a flow description, wherein said flow description comprises said list of connection identifiers.

* * * * *